May 21, 1963
U. A. CORTI ETAL
3,090,226
MOTION MEASURING APPARATUS
Filed Feb. 16, 1955
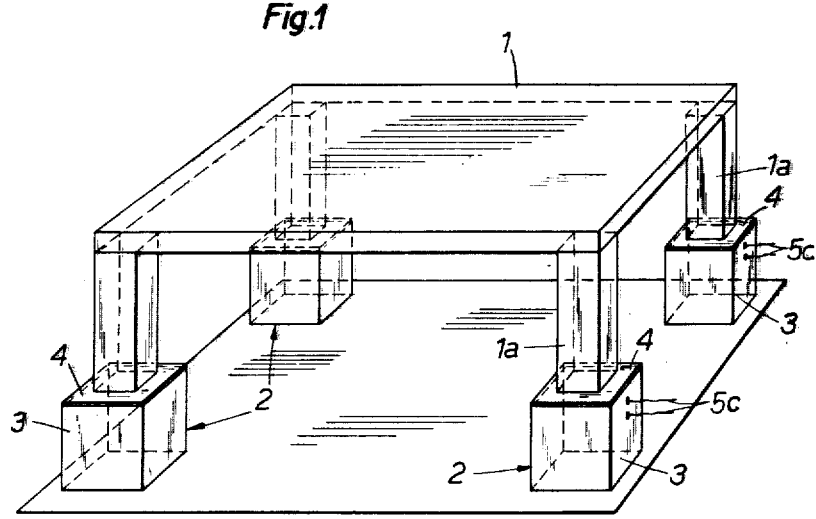
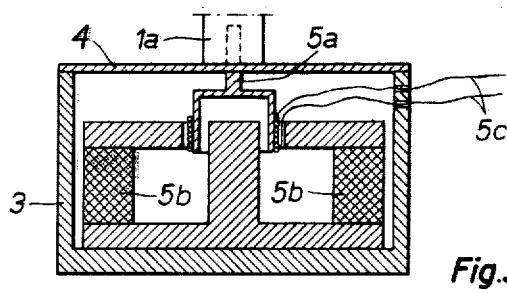
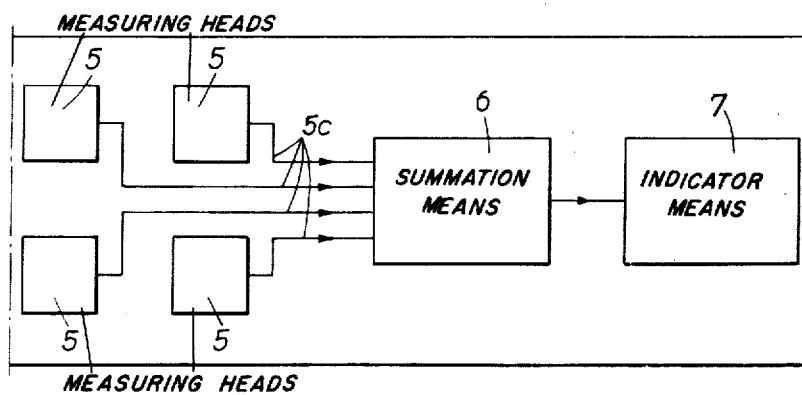

3,090,226
MOTION MEASURING APPARATUS
Ulrich A. Corti, 6 Waldschulweg, Zurich, Switzerland; Fritz Gassmann, 7 Zurichstrasse, Kusnacht, Zurich, Switzerland; and Max Weber, 345 Bremgartenstrasse, Wohlen, Switzerland
Filed Feb. 16, 1955, Ser. No. 488,618
2 Claims. (Cl. 73—141)

The present invention relates to a motion measuring apparatus. There are several apparatus known for motion measuring on living beings. Such known apparatus may be divided into two groups, namely: an optical and a mechanical group. Cinematographs and stroboscopes obviously belong to the optical group. The measuring apparatus of this group permit evaluation of the geometry of the motion only, but not of the dynamics. In other words it is not possible to obtain indications on the active forces and transformations of energy. The apparatus of the second, i.e. mechanical group, all have one feature in common, i.e., that the subject to be tested is brought into touch with a contact element of the measuring device. The contact element is put in motion by the tested subject and transmits the motion to the measuring apparatus which records or indicates it. For example, the contact element is applied to the chest of a tested person for measuring the movement imparted to the contact point by the action of the heart, or for the purpose of measuring the trembling of a hand the latter may be pressed against the contact element. Another known apparatus of this group consists of a cage, the floor of which serves as contact element. An animal moving in said cage imparts motion to the latter, which motion closes or opens electrical contacts. The operation of all known motion measuring apparatus of the mechanical group may be described as follows: The tested living subject is in touch with its material surroundings such as floors and the like. On all points of contact the tested subject exerts forces upon its surroundings, which are variable in time. A portion of these points of contact belongs to the contact element of the measuring apparatus and the forces exerted by the tested subject upon these points actuate the measuring apparatus. Now the distribution of the forces exerted by the tested subject onto the different points of contact depends to a high degree on the particulars of the test. The pressure of a hand against a contact element depends on the position of the tested person. Likewise the number of measuring contacts actuated by an animal in the above-mentioned cage is very hazardous and depends on the path followed by the animal in the cage. All known mechanical motion measuring apparatus have one factor in common, that, of all forces exerted by a tested subject upon its surroundings only a portion is taken up by the measuring operation. The above-mentioned cage makes no exception therefrom as it is provided on the ground with supporting elements such as springs, joints etc., so that the forces transmitted by the supporting elements cannot be taken into consideration. Measures obtained with such devices cannot, therefore, give a general view of the total forces exerted by the tested subject upon its surroundings, and several similar tests can therefore not be compared.

It is a prime object of the present invention to provide a motion measuring apparatus with which the total forces exerted by a tested subejct on its surroundings may be measured, so that the required conditions for reproduction and comparison of the tests are met.

For this purpose the motion measuring apparatus according to the present invention is characterised by a transmitting device adapted to receive a test subject, one or several connecting elements providing the sole connection between the tested subject and the transmitting device on the one hand, and the surroundings thereof, on the other hand, and by an indicator system adapted to convert and indicate in appropriate measuring units the total movements of the transmitting device and the forces or components thereof, transmitted by the connecting elements.

Thus the main difference between the apparatus according to the invention and the heretofore known motion measuring apparatus resides in the fact that all mechanical connections between the system formed by the tested subject and the transmitting device, on the one hand, and the surroundings, on the other hand, are included in the indicator system, so that, for the first time, a living being, acting as a motor may be subjected to a measuring process complying with the requirements of a precise, physical measuring method both as regards possibility of reproduction of the test conditions and of comparing test results.

Other features and advantages of the invention will become apparent from the description now to follow, of a preferred embodiment thereof, in which reference will be made to the accompanying drawings, in which:

FIG. 1 is a perspective view showing the transmitting device and the connecting elements of an apparatus according to the present invention.

FIG. 2 illustrates, on enlarged scale, a vertical section through one of the connecting elements of FIG. 1, and FIG. 3 represents schematically the arrangement of the indicator system.

The represented motion measuring apparatus comprises a base 1 serving as transmitting device. This base 1 consists of a rectangular plate fitted at the corners with downward extending feet 1a (FIG. 1, 2). This base plate 1, which serves as a support for subject to be measured (not shown), rests with its feet 1a on connecting elements 2 (FIG. 1) which, together with the indicator system, constitute the measuring device. As is visible from FIG. 2 each of the connecting elements 2 comprises a casing 3 having as a cover an elastic diaphragm 4 to which the feet 1a of the base plate 1 are rigidly connected. The indicator system shown in FIG. 3 comprises four measuring heads 5, an electric summation circuit 6 and an indicator 7. Each of the four connecting elements 2 is provided with one of the said measuring heads 5 consisting of a moving coil 5a (FIG. 2) secured to the inner surface of the diaphragm 4 and of a ring magnet 5b secured to the bottom of the connecting element 2. Wires 5c connect the moving coil 5a with the summation circuit 6, which serves to adapt the output of the measuring heads 5b to the indicator 7 and simultaneously as an automatic calculating device. For example it may add up and integrate the voltage fluctuations resulting from the four measuring heads. The indicator 7 may be for example a pointer instrument or a recording instrument. As appropriate electronic measuring converters and indicators are well-known they will not be described here in detail.

The described apparatus operates as follows: The subject to be measured, e.g. a test person, is placed on the base plate 1. It is very important that the subject is supported solely by the base plate 1, i.e. that all objects possibly in touch with the subject are also supported solely by the base plate. In addition to the static stresses on the diaphragms owing to the weight of the tested subject, forces variable with time act upon the diaphragms 4 and are transmitted by the feet 1a. In the represented embodiment the flexures of the diaphragms caused by these additional forces, are proportional to the vertical components of such additional forces, while the voltage produced in the measuring heads 5 is proportional to the flexure velocities. By integration of these voltages in the summation circuit 6 it may be seen that the voltages are proportional to the flexures and thus to the vertical components of the additional forces and, by addition, (again in summation circuit 6) one may obtain voltages proportional to the vertical component resultant of all forces acting upon the diaphragms. By means of suitable gauging it is possible to determine the constant of proportionality and to read from indicator 7 the resultant vertical component of all additional forces caused by the movements of the tested subject.

The main application of the apparatus according to the present invention obviously lies in the measuring of movements of human beings, animals and plants, but the apparatus may of course also be used for the measuring of other mechanical process on living beings, such for example as changes of weight etc. The tested subject may either be an individual or a group. It is of course very important that the resilience of the diaphragms is such that the motion produced on the diaphragms by the tested subject is so small, that it does not, in return, disturb the natural motion of the latter. The following measurements are possible:

(a) Measurement of motor processes on test subjects left to themselves. Such motor processes are conscious movements on the spot change, of place, working operations, operation and handling of apparatus, as well as movements not or only partially controlled by the will of the tested subject, such as: trembling, jerking, wincing, sneezing, coughing, movement of the inner organs, utterance of sounds etc. The subject may be tested when awake, sleeping, drowsing, under narcosis or hypnosis etc. Such motion measuring often permits a state of disease to be ascertained.

(b) Measurement of motor reaction of the tested subject to external or internal actions, such for example as: mechanical actions (e.g. vibrations produced by a vibrator mounted on the base plate), thermal, acoustical, optical and/or electrical actions, physical stimulation, ingestion of food, irritants, pharmaceutical preparations poisons etc.; measurement of the velocity of reaction.

(c) Measurement of variations in respect of time of the weight of the tested subject.

(d) The measurements obtained by the apparatus of the present invention may be combined with other observations and/or measurements, e.g. with cinematographical recordings, with measurements of action currents, with phonoelectrocardiographics etc.

With respect to the construction of the different elements constituting the measuring apparatus the following indications are of interest. The transmitting device may be a platform, a chair, a bed, an open or closed container, a contact plate etc. permitting the tested subject to stand, to sit or to lie on the transmitting device, to lean against it, to be embedded therein or to move in or on it. Should the transmitting device be a container it may be filled with a liquid partly or entirely surrounding the tested subject. A closed container may be filled with air or any other gas and the tested subject may fly within said container.

The transmitting device is exclusively supported or suspended by connecting elements of suitable form, number and arrangement. Such connecting elements may be springs of any type such as helical springs, laminated springs, diaphragms etc. They may also form parts of measuring heads of the indicator system, such for example as piezo-electric quartzes, or may contain damping devices. The transmitting device may be supported by the connecting elements so as to have one or several degrees of free play and be able to execute only parallel movements, rotations round rigid axes, or if necessary movements of more general nature.

Any number, arrangement and type of the measuring heads of the indicator system may be used. For the purpose of checking the forces transmitted by the connecting elements to their vicinity (torsional moments included) the measuring heads are mounted in the connecting elements as well as other, additional measuring heads, may be used directly to measure the motion of the transmitting apparatus with respect to its vicinity. For example such additional measuring heads could be arranged as seismographs directly on the transmitting elements or on the tested living subject. The measuring heads may be of the moving coil type, or based on reluctance, piezo-electric, magnetostrictive, capacitative, resistance-responsive, (like strain gauges) carrier system, but they may also be based on any physical system, such for example as exclusively mechanical (lever transmission), hydraulical, optical, interferometric system, adapted to measure variations of length, changes of form, forces etc. In connecting elements provided with damping devices measuring heads for measuring the damping may also be provided. Thus for example the damping output of a Foucault current damping may be measured by means of a wattmeter.

If necessry transducers may be interconnected between the measuring heads and the indicator system, to work up automatically the values supplied by the measuring heads in a quantitatively controllable manner. A transducer (e.g. a moving coil) may consist of mechanical, acoustical, optical, electrical or other similar devices, in which the measured values, are combined, enlarged, reduced, analysed regarding frequencies or otherwise adapted to the indicator, by integration or differentiation etc. or altered to the values to be indicated.

The indicator may consist of one or several units. It is adapted to make the results of the converter visible or audible in a suitable manner. It may be a pointer instrument, a cathode-ray oscillograph, a loud-speaker, ear-phones, photographical, mechanical or magnetical recording devices, a counter device etc. In addition to making visible and/or audible the results, the indicator could also be of such construction as to permit storing, documentary recording, further statistical work etc. for example by printing, or by automatically punching cards etc. The indicator could also be arranged to transmit the results over greater distances, for example in order to permit simultaneous evaluation at one point of the results of several motion measuring apparatus located at different places.

We claim:

1. A motion measuring device adapted for being supported on a supporting medium comprising a transmitting means adapted to support a subject to be tested, connecting means connecting said transmitting means to said supporting medium and constituting the sole connection therebetween; said connecting means comprising a fixed rigid member supported on said supporting medium, and an elastic diaphragm supported on said rigid member and affixed thereto, said transmitting means being fixedly and centrally connected to said diaphragm; a transducer operatively coupled to said diaphragm to transduce displacements of said diaphragm into measurable units; and indicating means coupled to said transducer to indicate said units, said transmitting means comprising a platform and a plurality of legs depending therefrom, said connecting means comprising one said rigid member and elastic diaphragm for each leg, each leg being fixed to one of the elastic diaphragms.

2. A motion measuring device adapted for being supported on a supporting medium comprising a platform, legs depending from said platform, rigid members supported on the supporting medium for each of said legs, elastic diaphragms affixed on the rigid members, said legs being fixedly and centrally connected to the diaphragms, transducers coupled to the diaphragms, and indicating means coupled to the transducer to indicate displacements of the diaphragms.

References Cited in the file of this patent

UNITED STATES PATENTS

| | | |
|---|---|---|
| 1,147,127 | Troll | July 20, 1915 |
| 2,623,938 | Thomas | Dec. 30, 1952 |
| 2,688,873 | Burris-Meyer | Sept. 14, 1954 |
| 2,786,669 | Safford | Mar. 26, 1957 |

UNITED STATES PATENT OFFICE
CERTIFICATE OF CORRECTION

Patent No. 3,090,226                                       May 21, 1963

Ulrich A. Corti et al.

It is hereby certified that error appears in the above numbered patent requiring correction and that the said Letters Patent should read as corrected below.

In the heading to the printed specification, after line 7, insert -- Claims priority, application Switzerland Feb. 25, 1954 --.

Signed and sealed this 14th day of January 1964.

(SEAL)
Attest:

ERNEST W. SWIDER                                      EDWIN L. REYNOLDS

Attesting Officer                                       Acting Commissioner of Patents